US012020104B2

United States Patent
Chanthet et al.

(10) Patent No.: US 12,020,104 B2
(45) Date of Patent: Jun. 25, 2024

(54) ANTENNA FOR A RADIO FREQUENCY IDENTIFICATION TRANSPONDER AND RADIO FREQUENCY IDENTIFICATION TRANSPONDER

(71) Applicant: LINXENS HOLDING, Mantes-la-Jolie (FR)

(72) Inventors: Kachen Chanthet, Phra Nakorn Si Ayutthaya (TH); Niwat Somkhantee, Phra Nakorn Si Ayutthaya (TH)

(73) Assignee: LINXENS HOLDING, Mantes-la-Jolie (FR)

( * ) Notice: Subject to any disclaimer, the term of this patent is extended or adjusted under 35 U.S.C. 154(b) by 55 days.

(21) Appl. No.: 17/635,981

(22) PCT Filed: Aug. 22, 2019

(86) PCT No.: PCT/IB2019/000975
§ 371 (c)(1),
(2) Date: Feb. 16, 2022

(87) PCT Pub. No.: WO2021/033005
PCT Pub. Date: Feb. 25, 2021

(65) Prior Publication Data
US 2022/0300783 A1     Sep. 22, 2022

(51) Int. Cl.
*G06K 19/077*       (2006.01)
(52) U.S. Cl.
CPC .............. *G06K 19/07773* (2013.01)
(58) Field of Classification Search
CPC ....... G06K 19/07773; G06K 19/07786; G06K 19/0723
See application file for complete search history.

(56) References Cited

U.S. PATENT DOCUMENTS 8,319,610 B2    11/2012  Chang et al.
10,957,984 B2 *  3/2021  Kato ............... H01Q 5/321
(Continued)

FOREIGN PATENT DOCUMENTS

CN          107392287 A      11/2017
DE      10 2008 059453 A1     4/2010
(Continued)

OTHER PUBLICATIONS

Office Action for related Canadian Patent Application No. 3,150,403, dated Mar. 15, 2023, 4 pages.
(Continued)

*Primary Examiner* — Sonji N Johnson
(74) *Attorney, Agent, or Firm* — DITTHAVONG, STEINER. & MLOTKOWSKI

(57) ABSTRACT

An antenna for a radio frequency identification transponder includes an electrically conductive main portion, an electrically conductive first transverse portion and an electrically conductive second transverse portion. The first and second transverse portions are connected to opposite portions of the main portion, extend in an antenna width direction and are spaced apart from each other in an antenna length direction. The antenna further includes an electrically conductive first tail portion extending in the antenna length direction and being connected to an end of the first transverse portion distal of the main portion. The main portion includes a loop and a plurality of meanders. The loop includes a pair of contacts configured for connecting the antenna to a radio frequency identification chip. An extension of the meanders in the antenna width direction is smaller than an extension of the loop in the antenna width direction.

12 Claims, 6 Drawing Sheets

(56) References Cited

U.S. PATENT DOCUMENTS

| | | |
|---|---|---|
| 2005/0024287 A1 | 2/2005 | Jo et al. |
| 2005/0134506 A1* | 6/2005 | Egbert ............... H01Q 9/265 |
| | | 343/867 |
| 2006/0044192 A1 | 3/2006 | Egbert |
| 2011/0147467 A1 | 6/2011 | Choi et al. |

FOREIGN PATENT DOCUMENTS

| | | |
|---|---|---|
| JP | 2005-190043 A | 7/2005 |
| WO | 2009/023118 A1 | 2/2009 |
| WO | 2010050361 A1 | 5/2010 |
| WO | 2021033005 A1 | 2/2021 |

OTHER PUBLICATIONS

Office Action for related Chinese Patent Application No. 201980099476.6, dated Jul. 21, 2023, with Machine Translation, 21 pages.
Office Action for related Korean Patent Application No. 10-2022-7006037, dated May 25, 2023, 13 pages.
Office Action for related European Patent Application No. 19 804 821.7-1205, dated Sep. 18, 2023, 4 pages.
International Search Report and Written Opinion of the International Searching Authority for related International Application No. PCT/IB2019/000975, dated Apr. 29, 2020, 10 pages.

* cited by examiner

ANTENNA FOR A RADIO FREQUENCY IDENTIFICATION TRANSPONDER AND RADIO FREQUENCY IDENTIFICATION TRANSPONDER

TECHNOLOGICAL FIELD

The invention relates to antennas, in particular to antennas for radio frequency identification transponders, and to radio frequency identification transponders.

BACKGROUND

Radio frequency identification (RFID) transponders may be used in a variety of applications, wherein objects and/or living beings are identified and/or located automatically and contactless. In RFID technology, transponders are used which may receive radio waves from an RFID reader and send a response to the RFID reader. For this purpose, each RFID transponder may include an electronic circuit, which is typically provided in the form of one or more integrated circuit chips, and one or more antennas. In some applications of RFID, passive RFID transponders may be used. Passive RFID transponders do not include a battery, and the electronic circuits of the RFID transponder are operated using the energy of radio waves received from the RFID reader. Alternatively, active RFID transponders including a battery may be used, wherein the electronic circuits of the RFID transponder are operated by means of energy from the battery.

For communication between RFID readers and RFID transponders, radio waves in a number of frequency ranges may be employed, which may range from long wave frequencies to microwave frequencies. The use of frequency ranges by RFID transponders and readers is limited by legal provisions. Frequency ranges which are allowed to be used by RFID transponders and readers may differ from country to country.

In some applications of RFID technology, ultra-high frequency (UHF) radio waves may be used for communication between RFID transponders and readers. Legal provisions allowing the use of UHF frequency ranges for RFID applications differ from country to country. For example, in European countries, such as France, Germany and the United Kingdom, the allowed UHF band includes frequencies from 865.6 MHz to 867.6 MHz. In the United States of America, the allowed UHF frequency band includes higher frequencies in a range from 902 MHz to 928 MHz. In other countries, still further UHF frequency bands are specified for RFID applications, which are typically in a frequency range from about 800 MHz to about 950 MHz.

RFID transponders include antennas which are adapted for use at the frequencies of radio waves transmitted and received by the RFID transponder, wherein the design of the antennas is subject to limitations caused by the space available for the antenna and/or requirements concerning robustness and/or ease of manufacturing. Examples of antennas for RFID transponders adapted for communication in the UHF frequency range are disclosed in US 2006/0044192 A1, CN 107392287 A, DE 102008059453 A1, WO 2009/023118 A1 and JP 2005-190043 A.

A problem of known antennas for RFID transponders is that they provide only a relatively narrow frequency range wherein the antenna may be used. Curves illustrating the frequency dependency of the antenna gain or a parameter that is representative of the antenna gain such as, for example, curves illustrating the frequency dependency of the read range of the RFID transponder, typically show a peak that corresponds to a resonance frequency of the antenna. The antenna is designed such that the peak is in a desired frequency range which may be, for example, the UHF frequency range that is allowed for RFID applications in the country wherein the RFID transponder is to be used.

However, the possibilities of operating known RFID antennas in a number of different frequency ranges, for example, different UHF frequency ranges that are allowed for use by RFID applications in different countries, may be limited.

SUMMARY

The present disclosure provides antennas for radio frequency identification transponders and radio frequency identification transponders which may be used in a wider frequency range.

An antenna for a radio frequency identification transponder according to the present disclosure includes an electrically conductive main portion, an electrically conductive first transverse portion and an electrically conductive second transverse portion. The first and second transverse portions are connected to opposite ends of the main portion, extend in an antenna width direction and are spaced apart from each other in an antenna length direction. The antenna additionally includes an electrically conductive first tail portion. The first tail portion extends in the antenna length direction and is connected to an end of the first transverse portion distal of the main portion. The main portion includes a loop including a pair of contacts configured for connecting the antenna to a radio frequency identification chip and a plurality of meanders. An extension of the meanders in the antenna width direction is smaller than an extension of the loop in the antenna width direction.

Antennas as disclosed herein may be suitable for use in a relatively wide frequency range. The loop, including a pair of contacts configured for connecting the antenna to a radio frequency identification chip may allow to match the impedance of the antenna to the impedance of the radio frequency identification chip. Providing the electrically conductive first tail portion extending in the antenna length direction and being connected to an end of the first transverse portion distal of the main portion, and the plurality of meanders of the main portion having an extension in the antenna width direction that is smaller than an extension of the loop in the antenna width direction, may allow to provide a relatively large and relatively slightly varying antenna gain in a relatively wide frequency band.

In embodiments, all the meanders of the main portion may be arranged between the loop and the second transverse portion. Thus, an asymmetrical configuration of the antenna may be provided which may allow feeding resonance modes of the antenna being even and odd harmonics of the fundamental frequency of the antenna, and improving wideband characteristics of the antenna.

In embodiments, the pair of contacts may be provided at portions of the loop extending in the antenna width direction. Thus, a favorable location for the radio frequency identification chip may be provided.

In embodiments, three meanders of the main portion may be provided.

In embodiments, the antenna may further include an electrically conductive second tail portion extending in the antenna length direction and being connected to an end of the second transverse portion distal of the main portion. The second tail portion may allow to adapt the frequency band of operation of the antenna, wherein an increase or decrease of the length of the second tail portion allows to shift the frequency range of operation of the antenna to lower or higher frequencies.

In embodiments, at least one of the following may be fulfilled:

an antenna length being a distance between the first transverse portion and the second transverse portion in the antenna length direction is in a range from 55 mm to 85 mm;

an antenna width being an extension of the first and second transverse portions in the antenna width direction is in a range from 10 mm to 25 mm;

a length of the first tail portion is in a range from 8 mm to 16 mm;

a length of the second tail portion is in a range from 2 mm to 15 mm;

the extension of the meanders in the antenna width direction is in a range from 2 mm to 15 mm;

an extension of the meanders in the antenna length direction is in a range from 4 mm to 12 mm;

the extension of the loop in the antenna width direction is in a range from 12 mm to 18 mm;

an extension of the loop in the antenna length direction is in a range from 3 mm to 6 mm;

a spacing between a meander closest to the second transverse portion and the second transverse portion is in a range from 2 mm to 14 mm;

a spacing between a meander closest to the loop and the loop is in a range from 4 mm to 12 mm; and a spacing between the loop and the first transverse portion is in a range from 4 mm to 12 mm.

Providing dimensions of the portions of the antenna in the above-specified ranges may allow to provide an antenna which is particularly suitable for use in a frequency range from 800 MHz to 950 MHz, wherein a relatively large and only relatively slightly varying antenna gain may be obtained in the frequency range from 800 MHz to 950 MHz.

In embodiments, two meanders of the main portion may be provided, and the antenna further includes an electrically conductive second tail portion extending in the antenna length direction and being connected to an end of the second transverse portion distal of the main portion. Thus, an alternative design of the antenna may be provided.

In embodiments, the antenna may have a first resonance frequency being a harmonic of a fundamental frequency of the antenna, and a second resonance frequency, being a next larger harmonic of the fundamental frequency of the antenna, wherein the first resonance frequency is smaller than 800 MHz and the second resonance frequency is greater than 950 MHz. The configuration of the antenna may allow providing a first resonance peak at the first resonance frequency and a second resonance peak at the second resonance frequency which are broad enough to overlap to a certain extent, and to allow a relatively large and only relatively slightly varying antenna gain in the frequency range of overlap, which may include the frequency range from 800 MHz to 950 MHz.

In embodiments, the first resonance frequency may be a third harmonic of the fundamental frequency of the antenna and the second resonance frequency may be a fourth harmonic of the fundamental frequency of the antenna.

In embodiments, the main portion, the transverse portions and the tail portions may be formed by a conductive material provided on a plastic substrate. Thus, the antenna may be easily manufactured at relatively low cost.

In embodiments, the metal may include at least one of copper and aluminum. Thus, a relatively high conductivity of the main portion, the transverse portions and the tail portions may be provided.

In embodiments, an extension of the antenna in the antenna width direction may be 27 mm or less and an extension of the antenna in the antenna length direction may be 86 mm or less. Thus, the antenna may be provided so that it has an extension to fit inside half of a size ID-1 according to ISO/IEC 7810. In embodiments, a radio frequency identification transponder may include an antenna as described above, and a radio frequency identification chip electrically connected to the pair of contacts, wherein the radio frequency identification chip includes circuitry configured for sending and receiving electromagnetic radiation at one of more frequencies in a range from 800 MHz to 950 MHz. Thus, a radio frequency identification transponder, wherein the antenna is matched to the radio frequency identification chip, may be provided.

A radio frequency identification transponder according to an embodiment includes a radio frequency identification chip. The radio frequency identification chip includes circuitry configured for sending and receiving electromagnetic radiation at one or more frequencies in a frequency range between a lower frequency limit and an upper frequency limit. Additionally, the radio frequency identification transponder includes an antenna connected to the radio frequency identification chip. The antenna has a first resonance frequency being a harmonic of a fundamental frequency of the antenna and a second resonance frequency being a next larger harmonic of the fundamental frequency of the antenna, wherein the first resonance frequency is smaller than the lower frequency limit and the second resonance frequency is greater than the upper frequency limit.

Thus, the radio frequency identification chip may be operated in a frequency range between two resonance frequencies of the antenna. The inventors have found that this may allow providing a sufficiently large and only relatively slightly varying antenna gain in the frequency range between the lower frequency limit and the upper frequency limit.

In embodiments, the antenna may have a first quality factor at the first resonance frequency and a second quality factor at the second resonance frequency, wherein the first quality factor and the second quality factor are adapted such that an antenna gain of the antenna varies by less than a factor of 2 in the frequency range. The quality factor, also denoted as "Q-factor" at a resonance frequency of the antenna may be defined as a ratio between the resonance frequency and the full width half maximum of the resonance peak at the resonance frequency. Thus, a smaller quality factor corresponds to a wider resonance peak. By providing sufficiently small quality factors of the antenna at the first and second resonance frequencies, an overlap of the peak of the antenna gain at the first resonance frequency and the peak of the antenna gain at the second resonance frequency may be obtained, which may allow to provide a variation of the antenna gain by less than a factor of 2 in the frequency range.

In embodiments, the lower frequency limit may be 800 MHz and the upper frequency limit may be 950 MHz. This may allow the use of a radio frequency identification transponder in number of the UHF RFID bands specified by legal regulations in a number of countries.

In embodiments, the first resonance frequency may be a third harmonic of the fundamental frequency of the antenna and the second resonance frequency may be a fourth harmonic of the fundamental frequency of the antenna.

In embodiments, the antenna may have some or all of the features described above, wherein the radio frequency identification chip is connected to the pair of contacts.

BRIEF DESCRIPTION OF THE DRAWINGS

In the following, embodiments of the present invention will be described with reference to the figures in which.

In the following, embodiments will be described with reference to the figures.

Figure 1:
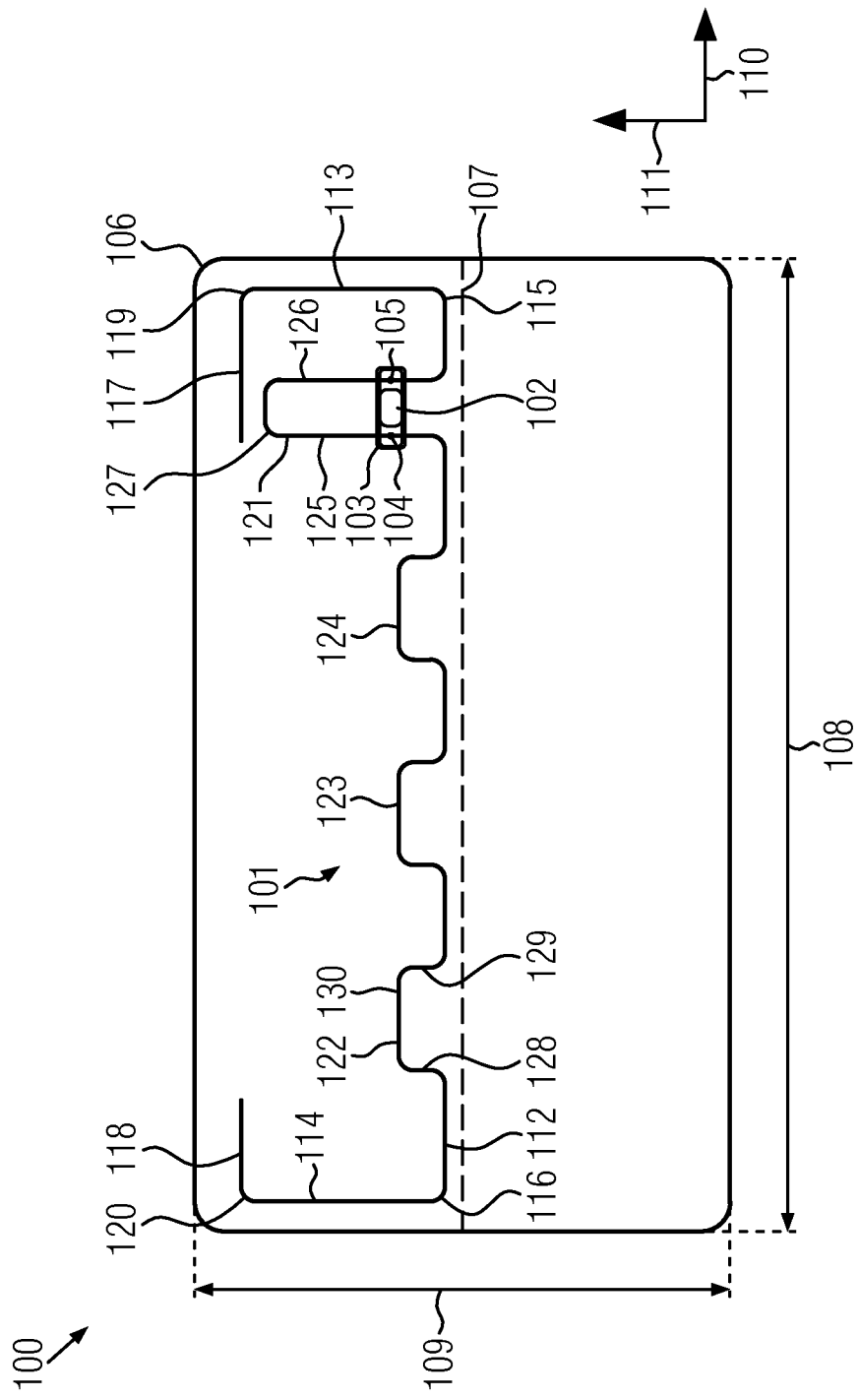
FIG. 1 shows a schematic view of a radio frequency identification (RFID) transponder according to an embodiment.

FIG. 1 shows a schematic view of a radio frequency identification (RFID) transponder 100 according to an embodiment.

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

DETAILED DESCRIPTION

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

The RFID transponder 100 may include an RFID chip 102. The RFID chip 102 may include an integrated circuit, which includes circuitry configured for sending and receiving electromagnetic radiation at one or more frequencies in a frequency range between a lower frequency limit and an upper frequency limit. In embodiments, the electromagnetic radiation may include radio waves at one or more frequencies in the frequency range from about 800 MHz to about 950 MHz. This frequency range includes a number of ultrahigh frequency (UHF) frequency bands wherein UHF communication between RFID transponders and RFID readers is allowed to be performed according to legal provisions in various countries. In particular, the frequency range from 800 MHz to 950 MHz includes including frequency ranges from 920 to 926 MHz (Australia), 902 to 907.5 MHz (Brazil), 865.6 to 867.6 MHz (France, Germany, the United Arab Emirates and the United Kingdom), 865 to 868 MHz (China, including Hong Kong), 916.7 to 920.9 MHz (Japan), 917 to 920.8 MHz (Republic of Korea), 866 to 869 MHz (Singapore), 920 to 925 MHz (Thailand) and 902 to 928 MHz (United States of America).

The RFID transponder further includes an antenna 101 which is connected to the RFID chip 102. In embodiments, the RFID chip 102 may be provided on a substrate with electronic connection 103. In embodiments, the substrate with electronic connection 103 may be a printed circuit board. In other embodiments, the substrate with electronic connection 103 may be a module packaging. The substrate with electronic connection 103 may be electrically connected to contacts 104, 105 of the antenna 101. In embodiments, the connection between the substrate with electronic connection 103 and the contacts 104, 105 may be provided by soldering the antenna to contact pads that are provided on the substrate with electronic connection 103, wherein the soldering process forms the contacts 104, 105.

The antenna 101 may be formed from a wire of an electrically conductive metal, for example, copper or a copper alloy. Other electrically conductive metals, such as, for example, aluminum, may also be used. In other embodiments, the antenna 101 may be formed from an electrically conductive metal formed on the substrate 106 by printing, or, alternatively, by depositing a metal layer and performing an etch process.

The antenna 101, the RFID chip 102 and substrate with electronic connection 103 may be provided on a substrate 106 which, in embodiments, may be formed from a plastic material, such as polyvinyl chloride (PVC). Other plastic materials may also be used. In embodiments, the substrate 106 may be provided as a plastic sheet.

In embodiments, the substrate 106, the antenna 101, the RFID chip 102 and substrate with electronic connection 103 may be covered by a plastic cover sheet, so that the antenna 101, the RFID chip 102 and substrate with electronic connection 103 are protected from mechanical damage and/or humidity. In other embodiments, the plastic cover sheet may be omitted.

The substrate 106 may have a rectangular shape, having side lengths 108, 109. In embodiments, the substrate 106 may have a size in accordance with the ID-1 format according to international standard ISO/IEC 7810, wherein the longer side length 108 is approximately 86 mm and the shorter side length 109 is approximately 54 mm. Other sizes of the substrate 106 can also be used, for example a size in accordance with the ID-3 format according to ISO/IEC 7810, wherein the longer side length 108 is approximately 125 mm and the shorter side length 109 is approximately 88 mm. Corners of the substrate 106 may be rounded.

The RFID chip 102, the substrate with electronic connection 103 and the antenna 101 may be provided over one half of the substrate 106 which, in the view of FIG. 1, is the upper half. In FIG. 1, a dashed line 107 schematically illustrates the extension of the upper half of the substrate 106.

The antenna 101 may include a number of portions generally extending in an antenna length direction 110, which may correspond to a direction of the longer sides of the approximately rectangular substrate 106, and portions generally extending in an antenna width direction 111, which may corresponds to a direction of the shorter sides of the approximately rectangular substrate 106. Between portions of the antenna 101 extending in the antenna length direction 110, and adjacent portions of the antenna 101 extending in the antenna width direction 111, rounded corner portions may be provided.

The antenna 101 may include an electrically conductive main portion 112 having ends 115, 116, wherein an extension of the main portion 112 in the antenna length direction 110 may be greater than an extension of the main portion 112 in the antenna width direction 111. The main portion 112 may include a loop 121, which includes two portions 125, 126 extending in the antenna width direction 111, and a portion 127 extending in the antenna length direction 110, which connects the portions 125, 126. The contacts 104, 105 for connecting the antenna 101 to the RFID chip 102 may be provided on the portion 125 and the portion 126, respectively, so that a closed loop providing an inductivity which may be used for impedance matching is formed when the RFID chip 102 is connected to the contacts 104, 105 by means of the substrate with electronic connection 103. The position of the chip 102 and the substrate with electronic connection 103 may be shifted towards the portion 127 of the loop relative to a straight line connecting the ends 115, 116 of the main portion 112, so that the contacts 104, 105 are at a distance from the straight line connecting the ends 115, 116 of the main portion.

Figure 6:
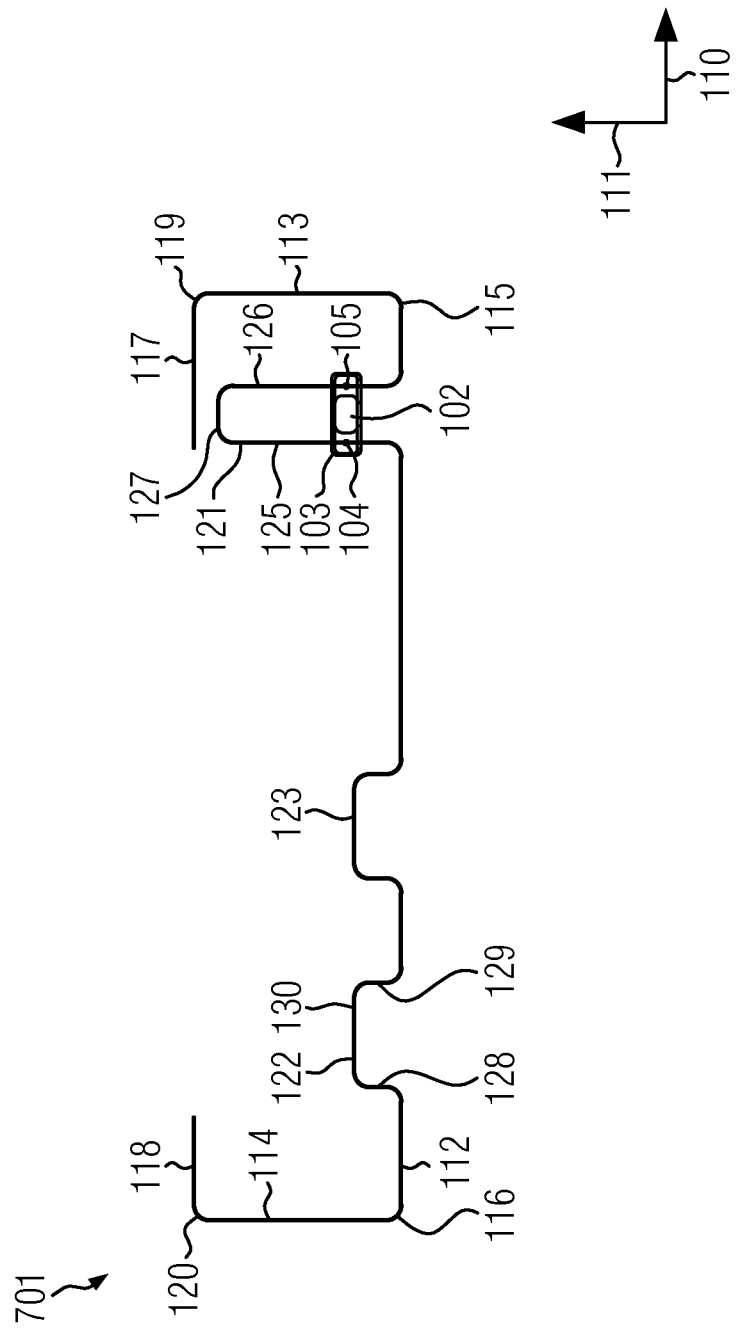

The main portion 112 may include a plurality of meanders 122, 123, 124. In embodiments, as shown in FIG. 1, three meanders may be provided. In other embodiments, a different number of meanders, for example, two meanders, may be provided, as shown in FIG. 6 which will be discussed in more detail below. Each of the meanders 122, 123, 124 may include two portions 128, 129 extending in the antenna width direction 111, and a connecting portion 130 extending in the antenna length direction 110. In FIG. 1, the reference numerals 128, 129, 130 are exemplarily provided for the meander 122. However, the shape of the meanders 123, 124 may correspond to the shape of the meander 122, so that the meanders 123, 124 also include portions corresponding to the portions 128, 129, 130.

As shown in FIG. 1, at the meanders 122, 123, 124 and the loop 121, the direction of the wire forming the antenna 101 may deviate from a straight line between the ends 115, 116 of the main portion 112 of the antenna towards electrically conductive tail portions 117, 118 of the antenna 101. The tail portions 117, 118 may extend in the antenna length direction 110, and may be connected to the main portion 112 by electrically conductive transverse portions 113, 114. The transverse portions 113, 114 are connected to opposite ends 115, 116 of the main portion 112, wherein the transverse portion 113 is connected to the end 115 of the main portion 112 and the transverse portion 114 is connected to the end 116 of the main portion 112. The tail portion 117 is connected to an end 119 of the transverse portion 113 that is distal of the main portion 112, and the tail portion 118 is connected to an end 120 of the transverse portion 114 distal of the main portion 112.

Figure 5:
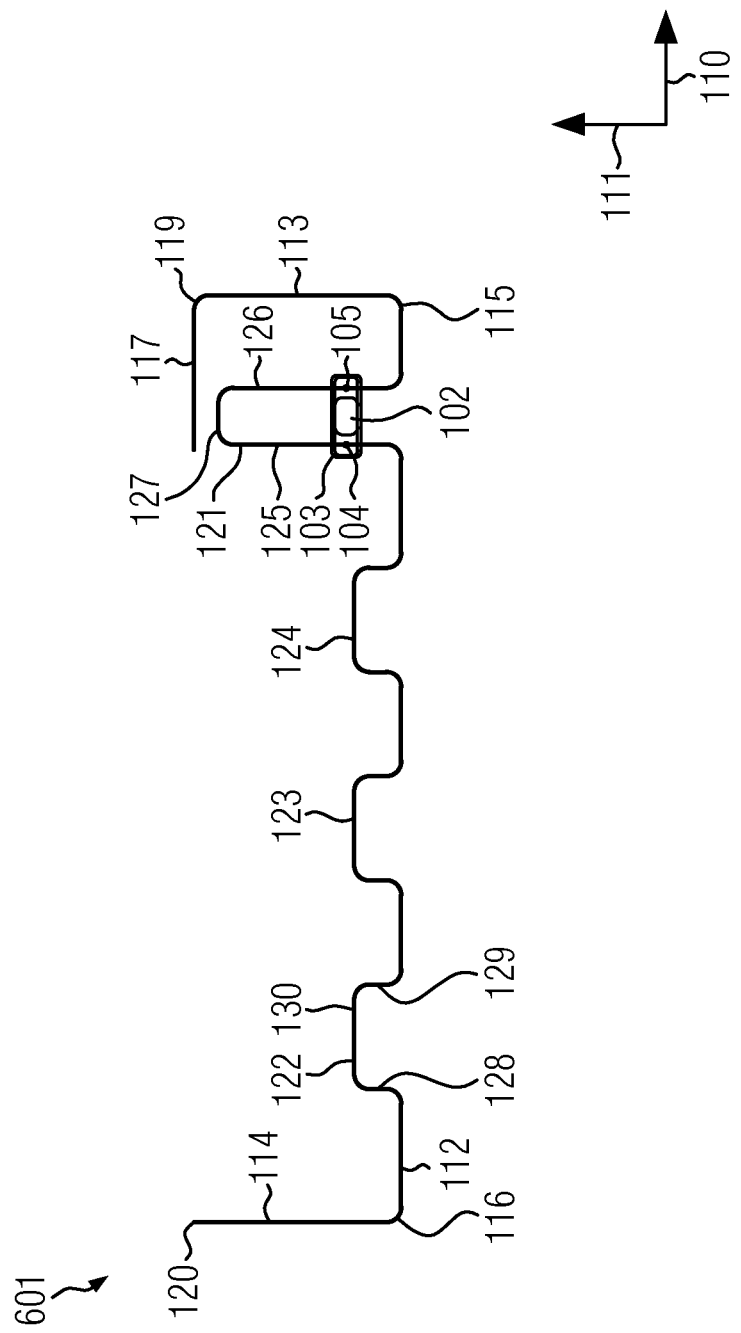
FIGS. 5 and 6 show configurations of antennas according to other embodiments.

The present disclosure is not limited to embodiments wherein two tail portions 117, 118 are provided. In some embodiments, one of the tail portions 117, 118, for example, the tail portion 118, may be omitted, as shown in FIG. 5, which will be discussed in more detail below.

The meanders 122, 123, 124 may be provided between the loop 121 and the transverse portion 114, which is located at a greater distance from the RFID chip 102 than the transverse portion 113, whereas no meanders need to be provided between the loop 121 and the transverse portion 113. Thus, an asymmetrical configuration of the antenna 101 may be provided, which may be helpful for matching characteristics of the antenna 101 for two different resonant frequencies which are an even and an odd multiple of a fundamental frequency of the antenna.

In embodiments, the extension of the antenna 101 in the antenna length direction 110 may be smaller than the longer side length 108 of the substrate 106 and the extension of the antenna 101 in the antenna width direction 111 may be smaller than one half of the smaller side length 109 of the substrate 106, so that the antenna 101, as well as the RFID chip 102 and the substrate with electronic connection 103, may be arranged over one half of the substrate 106. In particular, in embodiments, the extension of the antenna 101 in the antenna width direction may be 27 mm or less, and the extension of the antenna in the antenna length direction 110 may be 86 mm or less.

As shown in FIG. 1, an extension of the meanders 122, 123, 124 of the antenna 101 in the antenna width direction 111 may be smaller than an extension of the loop 121 in the antenna width direction 111. In embodiments wherein the meanders 122, 123, 124 include portions 128, 129 extending in the antenna width direction 111 and a connecting portion 130, and the loop 121 includes portions 125, 126 extending in the antenna width direction 111 and a connecting portion 127, the length of the portions 128, 129 of the meanders 122, 123, 124 may be smaller than the length of the portions 125, 126 of the loop 121.

Figure 2:
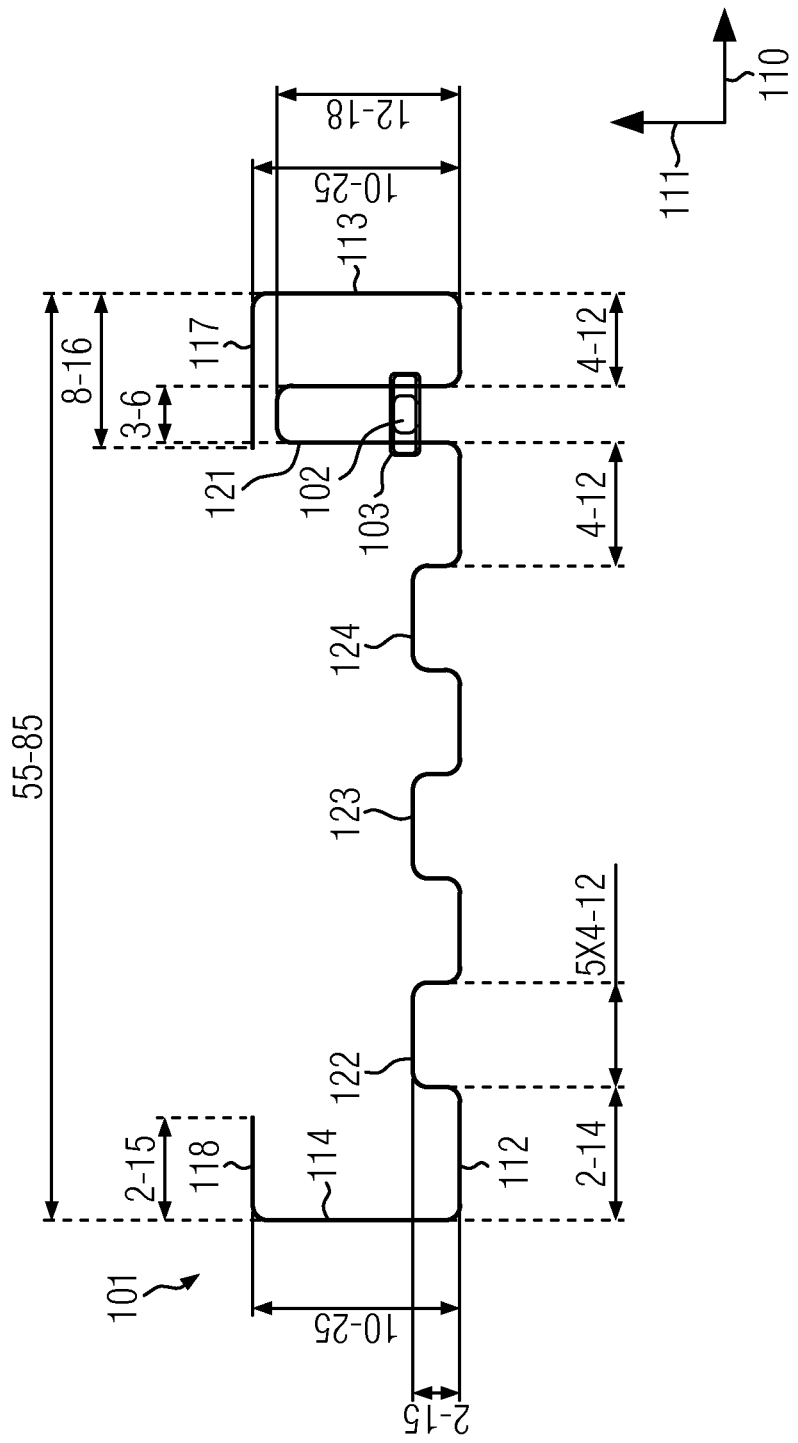
FIG. 2 shows ranges of the values of dimensions of parts of an antenna for an RFID transponder according to an embodiment.

FIG. 2 illustrates ranges of the values which the dimensions of the elements of the antenna 101 may have in embodiments. The unit of the dimensions specified in FIG. 2 is millimeters. For convenience, in FIG. 2, some of the reference numerals have been omitted for improving the clarity of illustration. In other embodiments, parts of the antenna 100 may have dimensions outside the ranges shown in FIG. 2.

As shown in FIG. 2, an antenna length, being a distance between the transverse portions 113, 114 in the antenna length direction 110 may be in a range from about 55 mm to about 85 mm. For example, the antenna length may be about 76.5 mm.

An antenna width, being an extension of the transverse portions 113, 114 in the antenna width direction 111 may be in a range from about 10 mm to about 25 mm, for example, about 17.0 mm. While, in some embodiments, the extensions of the transverse portions 113, 114 in the antenna width direction 111 may be approximately equal, in other embodiments, the extensions of the transverse portions 113, 114 in the antenna width direction 111 may be different, wherein the extension of the transverse portion 113 in the antenna width direction 111 may be in a range from about 14 mm to about 20 mm and the extension of the transverse portion 114 in the antenna width direction 111 may be in a range from about 10 mm to about 25 mm.

A length of the tail portion 117 may be in a range from about 8 mm to about 16 mm, for example, about 12.8 mm.

A length of the tail portion 118 may be in a range from about 2 mm to about 15 mm, for example, about 8.5 mm. An extension of the meanders 122, 123, 124 in the antenna length direction 110 may be in a range from about 4 mm to about 12 mm, for example about 8.6 mm. The extension of the meanders 122, 123, 124 in the antenna width direction 111 may be in a range from about 2 mm to about 15 mm, for example, about 3.8 mm. The extension of the loop 121 in the antenna width direction 110 may be in a range from about 12 mm to about 18 mm, for example, about 15.0 mm.

An extension of the loop 121 in the antenna length direction 110 may be in a range from about 3 mm to about 6 mm, for example, about 4.6 mm. A spacing between the meander 124, which is the meander closest to the loop 121 and the loop 121 may be in a range from about 4 mm to about 12 mm, for example about 10.2 mm. A spacing between the loop 121 and the transverse portion 113 may be in a range from about 4 mm to about 12 mm, for example, about 7.6 mm. A spacing between the meander 122 closest to the transverse portion 114 and the transverse portion 114 can be in a range from about 2 mm to about 14 mm, for example about 11.0 mm.

Figure 3:
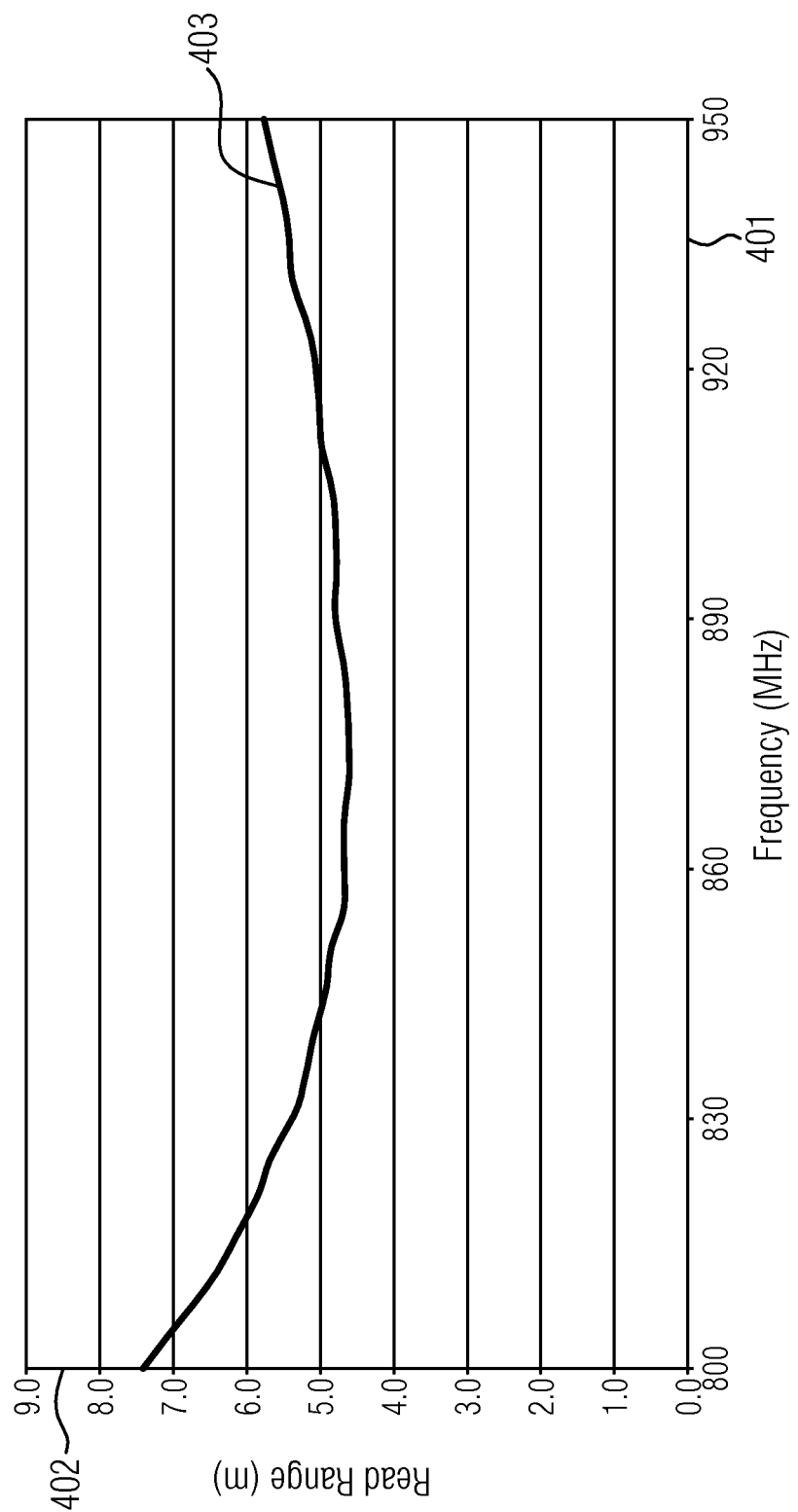
FIG. 3 shows a diagram illustrating the frequency dependency of a read range of a radio frequency identification transponder according to an embodiment.

FIG. 3 shows a diagram illustrating the dependency of a read range of a radio frequency identification transponder according to an embodiment, wherein an antenna as described above having elements as specified in FIG. 1 is provided. The read range is a maximum distance from which a communication between an RFID reader and the RFID transponder may be performed. The read arrange is related to an antenna gain of the antenna of the RFID transponder, wherein a greater antenna gain corresponds to a greater read range.

In FIG. 3, a horizontal coordinate axis 401 denotes frequency, and a vertical coordinate axis 402 denotes the read range. The dependency of the read range on frequency is illustrated by curve 403.

As may be seen from FIG. 3, in a frequency range between 800 MHz and 950 MHz, the read range is greater than about 4.5 meter and smaller than about 7.5 meter, so that the read range varies by less than a factor of two in the frequency range. Thus, providing an antenna as described above in an RFID transponder allows to obtain a sufficiently large and only relatively slightly varying read range in a frequency range from 800 MHz to 950 MHz, wherein various UHF frequency bands, within which the operation of RFID transponders and readers is allowed according to local legal provisions in various countries, may be obtained. Since the read range is related to the antenna gain, an antenna as described above may provide a relatively large and only slightly varying (for example, varying by less than a factor of two) antenna gain in the frequency range from 800 MHz to 950 MHz.

Accordingly, an antenna as described above may be used in a number of regional UHF frequency bands with approximately the same performance. Hence, a modification of an antenna design need not be performed for providing RFID transponders adapted for use in different countries. Furthermore, the inventors have found that an antenna as described above may have a better sensitivity than known antennas. For example, antennas as described above may be used at −70 dBm, whereas antennas according to the prior art are mostly active at −50 dBm.

Figure 4:
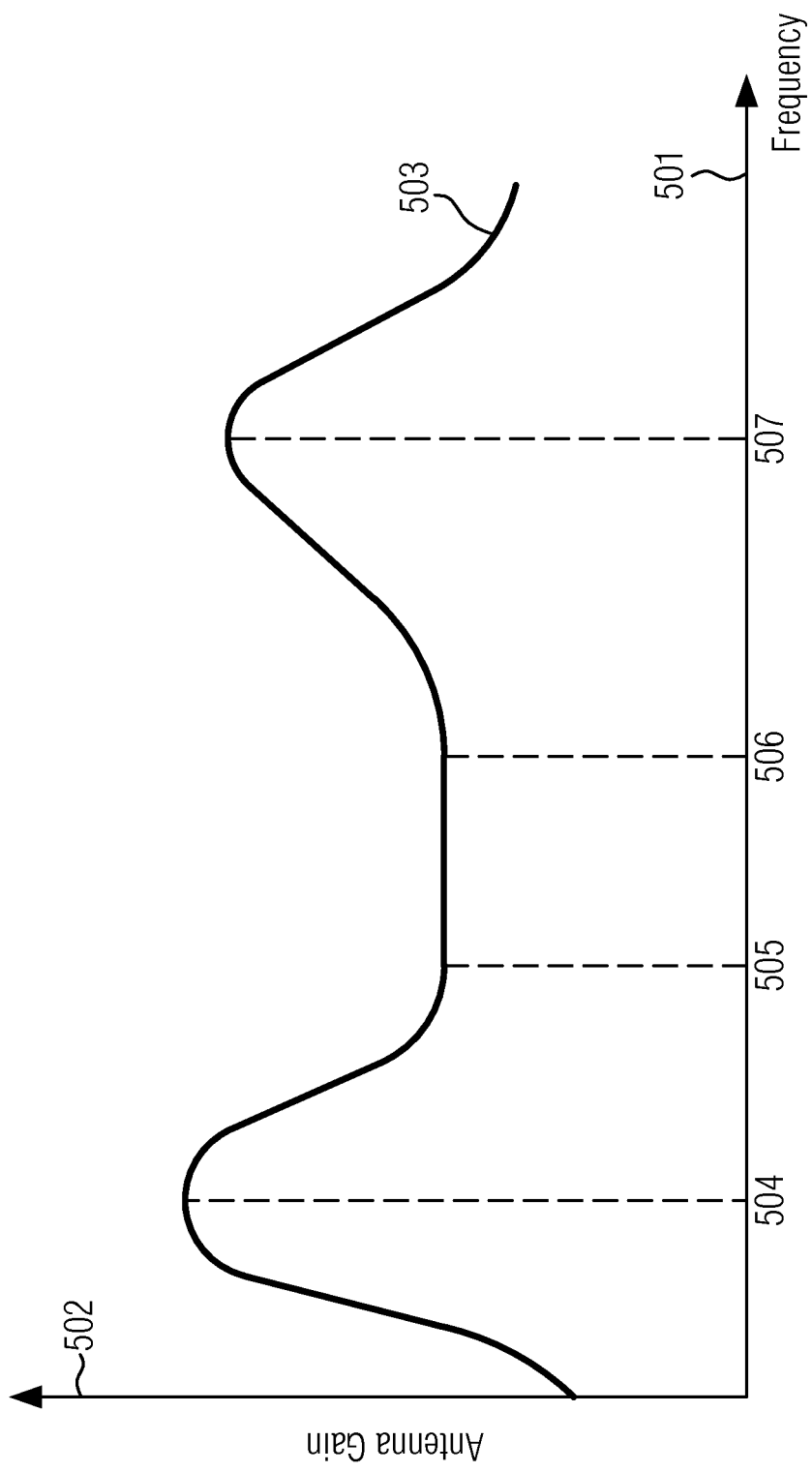
FIG. 4 schematically illustrates the frequency dependency of the antenna gain of an antenna according to an embodiment.

FIG. 4 schematically illustrates the dependency of the antenna gain of an antenna according to an embodiment on frequency for illustrating physical principles underlying the present disclosure in exemplary embodiments. In FIG. 4, a horizontal coordinate axis 501 denotes frequency, and a vertical coordinate axis 502 denotes the antenna gain.

A frequency range of interest is between a lower frequency limit 505 and an upper frequency limit 506. The lower frequency limit 505 and the upper frequency limit 506 may correspond to limits of a frequency range wherein an RFID chip to be used with the antenna sends and receives radio waves. In embodiments, the lower frequency limit 505 may be 800 MHz, and the upper frequency limit 506 may be 950 MHz.

The curve 503 illustrating the dependency of the antenna gain on frequency may include peaks having maxima at frequencies 504, 507, wherein the frequency 504 is smaller than the lower frequency limit 505, and the frequency 507 is greater than the upper frequency limit 506. The frequencies 504, 507 may correspond to resonance frequencies of the antenna, which are harmonics of a fundamental frequency of the antenna. In embodiments, the resonance frequency 507 may be a next larger harmonic of the fundamental frequency of the antenna than the resonance frequency 504. In some embodiments, the resonance frequency 504 may be a third harmonic of the fundamental frequency of the antenna, and the resonance frequency 507 may be a fourth harmonic of the fundamental frequency of the antenna. In the frequency range between the lower frequency limit 505 and the upper frequency limit 506, no resonance frequencies of the antenna need to be present.

The antenna may have a first quality factor at the resonance frequency 504, and a second quality factor at the resonance frequency 507. As described above, the quality factor, or Q-factor, respectively, of the antenna at the resonance frequency, which may be defined as a ratio between the resonance frequency and the full width half maximum of the resonance peak at the resonance frequency, is a measure for the width of the peak of the antenna gain at the respective resonance frequency.

A lower quality factor of the antenna at a resonance frequency corresponds to a wider resonance peak. If the quality factors of the antenna 101 at the resonance frequencies 504, 507 are relatively small, relatively wide resonance peaks at the resonance frequencies 504, 507 are obtained, so that the resonance peaks overlap in the frequency range between the lower frequency limit 505 and the upper frequency limit 506. Thus, in the frequency range from the lower frequency limit 505 to the upper frequency limit 506, a relatively slightly varying and relatively large antenna gain may be obtained, for example, an antenna gain that varies by less than a factor of 2 in the frequency range.

The antenna 101 may be configured for feeding both the resonance at frequency 504, and for feeding the resonance at frequency 507 For this purpose, an asymmetrical configuration of the antenna 101, as shown in FIGS. 1, 2, 5 and 6 may be of advantage, since this can allow feeding both resonance frequencies being even multiples of the fundamental frequency of the antenna (even harmonics such as the fourth harmonic) and resonance frequencies being odd multiple frequencies of the fundamental frequency (odd harmonics such as the third harmonic). In some embodiments, the antenna may be adapted such that there is an approximately equal feed point impedance at the frequency 504 and the frequency 507.

The present disclosure is not limited to embodiments wherein the antenna has a configuration as described above with reference to FIG. 1. FIGS. 5 and 6 show configurations of antennas according to other embodiments. For convenience, in FIGS. 1 and 2 on the one hand, and in FIGS. 5 and 6 on the other hand, like reference numerals have been used to denote corresponding features. Unless indicated otherwise, in FIGS. 1, 2, 5 and 6, elements denoted by like reference numerals may have corresponding features, and a detailed description thereof will be omitted.

FIG. 5 shows a configuration of an antenna wherein only the tail portion 117 is provided, and the tail portion 118 is omitted. FIG. 6 shows a configuration of an antenna wherein only two meanders 122, 123 are provided, and the meander 124, which is provided in the embodiments shown in FIGS. 1, 2 and 5, is omitted.

The inventors have performed experiments wherein parameters of an antenna design were varied in order to study effects of parameters of the design on the frequency dependency of the read range of an RFID transponder including the antenna. In particular, an increase of the extension of the meanders 122, 123, 124 in the antenna width direction 111 may lead to a decrease of the read range and a reduced flatness of the frequency dependence of the read range. Thus, providing an extension of the meanders 122, 123, 124 in the antenna width direction 111 that is smaller than an extension of the loop 121 in the antenna width direction 111 may allow to obtain a relatively large read range and relatively small variations of the read range within a frequency range of interest.

The dimensions of the loop 121 may have an influence on the performance of the transponder. Thus, dimensions of the loop 121 may be provided for matching the impedance of the antenna 101, 601, 701 to the impedance of the RFID chip 102. Since the impedance of the antenna 101, 601, 701 may depend on other parameters such as, for example, dimensions of the tail portion 118, variations of other parameters of the design of the antenna 101, 601, 701 may require a modification of the dimension of the loop 121.

The presence of the tail portion 117 may improve a flatness of the dependency of the read range on frequency, so that providing the tail portion 117 may improve the frequency dependency of the read range and the antenna gain. The length of the tail portion 118 may have an influence on the resonance frequencies of the antenna 101, 601, 701, so that variations of the length of the tail portion 118 may be used for shifting the curve illustrating the dependency of the read range or the antenna gain, respectively, on frequency to a desired frequency range.

Further elements of the design of the antenna 101, 601, 701 may include a physical antenna aperture, being the area wherein the antenna 101, 601, 701 is provided, and a total wire length of the antenna 101. The physical antenna aperture can be defined in accordance with an available area on the substrate 106, as detailed above, and it may provide an upper limit of the effective aperture of the antenna 101, 601, 701 that affects the performance of the antenna 101, 601, 701. The total wire length of the antenna 101, 601, 701, being a length of the electrically conductive wire from which the antenna 101 is formed, may have an influence of the read range. In some situations, the read range may decrease, when the total wire length is increased, and it may increase, when the total wire length is decreased.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. An antenna for a radio frequency identification transponder, comprising:
   an electrically conductive main portion, an electrically conductive first transverse portion and an electrically conductive second transverse portion, the first and second transverse portions being connected to opposite ends of the main portion, extending in an antenna width direction and being spaced apart from each other in an antenna length direction;
   an electrically conductive first tail portion extending in the antenna length direction and being connected to an end of the first transverse portion distal of the main portion;
   wherein the main portion comprises:
   a loop comprising a pair of contacts configured for connecting the antenna to a radio frequency identification chip; and
   a plurality of meanders, an extension of the meanders in the antenna width direction being smaller than an extension of the loop in the antenna width direction;
   wherein an extension of the antenna in the antenna width direction is 27 mm or less and an extension of the antenna in the antenna length direction is 86 mm or less.

2. An antenna according to claim 1, wherein all the meanders of the main portion are arranged between the loop and the second transverse portion.

3. An antenna according to claim 1, wherein the pair of contacts is provided at portions of the loop extending in the antenna width direction.

4. An antenna according to claim 1, wherein three meanders of the main portion are provided.

5. An antenna according to claim 1, further comprising an electrically conductive second tail portion extending in the antenna length direction and being connected to an end of the second transverse portion distal of the main portion.

6. An antenna according to claim 5, wherein at least one of the following is fulfilled:
   an antenna length being a distance between the first transverse portion and the second transverse portion in the antenna length direction is in a range from 55 mm to 85 mm;
   an antenna width being an extension of the first and second transverse portions in the antenna width direction is in a range from 10 mm to 25 mm;
   a length of the first tail portion is in a range from 8 mm to 16 mm;
   a length of the second tail portion is in a range from 2 mm to 15 mm;
   the extension of the meanders in the antenna width direction is in a range from 2 mm to 15 mm;
   an extension of the meanders in the antenna length direction is in a range from 4 mm to 12 mm;
   the extension of the loop in the antenna width direction is in a range from 12 mm to 18 mm;

an extension of the loop in the antenna length direction is in a range from 3 mm to 6 mm;

a spacing between a meander closest to the second transverse portion and the second transverse portion is in a range from 2 mm to 14 mm;

a spacing between a meander closest to the loop and the loop is in a range from 4 mm to 12 mm; and a spacing between the loop and the first transverse portion is in a range from 4 mm to 12 mm.

7. An antenna according to claim 1, wherein two meanders of the main portion are provided, and wherein the antenna further comprises an electrically conductive second tail portion extending in the antenna length direction and being connected to an end of the second transverse portion distal of the main portion.

8. An antenna according to claim 1, wherein the antenna has a first resonance frequency being a harmonic of a fundamental frequency of the antenna and a second resonance frequency being a next larger harmonic of the fundamental frequency of the antenna, wherein the first resonance frequency is smaller than 800 MHz and the second resonance frequency is greater than 950 MHz.

9. An antenna according to claim 8, wherein the first resonance frequency is a third harmonic of the fundamental frequency of the antenna and the second resonance frequency is a fourth harmonic of the fundamental frequency of the antenna.

10. An antenna according to claim 1, wherein the main portion, the transverse portions and the tail portions are formed by a conductive material provided on a plastic substrate.

11. An antenna according to claim 10, wherein the conductive material comprises at least one of copper and aluminum.

12. A radio frequency identification transponder comprising:

an antenna according to claim 1; and a radio frequency identification chip electrically connected to the pair of contacts, wherein the radio frequency identification chip comprises circuitry configured for sending and receiving electromagnetic radiation at one or more frequencies in a frequency range from 800 MHz to 950 MHz.

* * * * *